United States Patent
Lee (10) Patent No.: US 8,705,802 B2
(45) Date of Patent: Apr. 22, 2014

(54) PROVIDING A MOTION IMAGE IN AN ULTRASOUND SYSTEM

(75) Inventor: Kwang Ju Lee, Seoul (KR)

(73) Assignee: Samsung Medison Co., Ltd., Kangwon-Do (KR)

( * ) Notice: Subject to any disclaimer, the term of this patent is extended or adjusted under 35 U.S.C. 154(b) by 385 days.

(21) Appl. No.: 13/150,664

(22) Filed: Jun. 1, 2011

(65) Prior Publication Data

US 2011/0295116 A1    Dec. 1, 2011

(30) Foreign Application Priority Data

Jun. 1, 2010    (KR) .................. 10-2010-0051514

(51) Int. Cl.
*G06T 7/20*    (2006.01)
(52) U.S. Cl.
USPC .......................................... 382/107; 382/128
(58) Field of Classification Search
CPC ........... A61B 8/08; G01S 15/36; G01S 15/50; G01S 15/58; G01S 15/62; G06T 7/20
USPC ............................ 382/107, 128; 600/437, 453
See application file for complete search history.

(56) References Cited

U.S. PATENT DOCUMENTS

| 2003/0018259 A1* | 1/2003 | Kawagishi et al. ........... 600/443 |
| 2003/0060709 A1 | 3/2003 | Hashimoto et al. ........... 600/443 |
| 2003/0204142 A1 | 10/2003 | Brock-Fisher et al. ........ 600/458 |
| 2005/0054925 A1 | 3/2005 | Hao et al. ...................... 600/443 |
| 2010/0245353 A1 | 9/2010 | Lee et al. ...................... 345/424 |
| 2012/0078097 A1* | 3/2012 | Wang et al. ................... 600/437 |

FOREIGN PATENT DOCUMENTS

| JP | 2002-143158 A | 5/2002 | |
| KR | 10-2010-0106633 A | 10/2010 | ............... A61B 8/14 |

OTHER PUBLICATIONS

Korean Office Action issued in Korean Patent Application No. 10-2010-0051514 dated Feb. 1, 2012.
Extended European Search Report issued in European Patent Application No. 11168038.5 dated Jul. 19, 2013.

* cited by examiner

*Primary Examiner* — Andrew W Johns
(74) *Attorney, Agent, or Firm* — McDermott Will & Emery LLP (57) ABSTRACT

Embodiments for providing a motion image are disclosed. In one embodiment, by way of non-limiting example, an ultrasound system comprises: an ultrasound data acquisition unit configured to form transmit signals having different phases between a $n^{th}$ frame and a $(n+1)^{th}$ frame, transmit and receive ultrasound signals to and from a target object based on the transmit signals to output ultrasound data; and a processing unit in communication with the ultrasound data acquisition unit, the processing unit being configured to form motion data corresponding to motion of the target object based on a phase difference between the ultrasound data corresponding to the $n^{th}$ frame and the ultrasound data corresponding to the $(n+1)^{th}$ frame, and form a motion image corresponding to the motion of the target object based on the motion data.

21 Claims, 7 Drawing Sheets

PROVIDING A MOTION IMAGE IN AN ULTRASOUND SYSTEM

CROSS-REFERENCE TO RELATED APPLICATIONS

The present application claims priority from Korean Patent Application No. 10-2010-0051514 filed on Jun. 1, 2010, the entire subject matter of which is incorporated herein by reference.

TECHNICAL FIELD

The present disclosure generally relates to ultrasound systems, and more particularly to providing a motion image in an ultrasound system.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two-dimensional (2D) or three-dimensional (3D) ultrasound images of internal features of an object (e.g., human organs).

The ultrasound system may provide ultrasound images of various modes including a brightness mode (B mode) image representing reflection coefficients of the ultrasound signals reflected from a target object of a living body with a 2D (two-dimensional) image, a Doppler mode (D mode) image representing speed of a moving object with spectral Doppler by using a Doppler effect, a color Doppler mode (C mode) image representing speed of a moving object with colors by using the Doppler effect, and an elastic mode (E mode) image representing mechanical characteristics of tissues object before and after applying a pressure thereto. In particular, the ultrasound system may transmit and receive ultrasound signals to and from the target object to thereby form Doppler signals corresponding to a region of interest (ROI), which is set on a B mode image. The ultrasound system may further form a C mode image that represents the speed of the moving object with colors based on the Doppler signals.

The ultrasound system may transmit and receive ultrasound signals to and from the living body at a predetermined period to acquire ultrasound data corresponding to an ensemble number (i.e., ensemble data). The ultrasound system may further form the Doppler signals based on the ensemble data. The ultrasound system may also perform a wall filtering process to remove a component corresponding to a tissue, which does not move, upon the Doppler signals based on a wall filter to form the C mode image. However, it takes a lot of time to acquire the ensemble data. Further, when a size of the ROI (i.e., a color box) is large, the frame rate of the C mode image is decreased.

SUMMARY

Embodiments for providing a plurality of slice images in an ultrasound system are disclosed herein. In one embodiment, by way of non-limiting example, an ultrasound system comprises: an ultrasound data acquisition unit configured to form transmit signals having different phases between a $n^{th}$ frame and a $(n+1)^{th}$ frame, transmit and receive ultrasound signals to and from a target object based on the transmit signals to output ultrasound data; and a processing unit in communication with the ultrasound data acquisition unit, the processing unit being configured to form motion data corresponding to a motion of the target object based on a phase difference between the ultrasound data corresponding to the $n^{th}$ frame and the ultrasound data corresponding to the $(n+1)^{th}$ frame, and form a motion image corresponding to the motion of the target object based on the motion data.

In another embodiment, there is provided a method of providing a motion image, comprising: a) forming transmit signals having different phases between a $n^{th}$ frame and a $(n+1)^{th}$ frame; b) transmitting and receiving ultrasound signals to and from a target object based on the transmit signals to output ultrasound data; c) forming motion data corresponding to a motion of the target object based on a phase difference between the ultrasound data corresponding to the $n^{th}$ frame and the ultrasound data corresponding to the $(n+1)^{th}$ frame; and d) forming a motion image corresponding to the motion of the target object based on the motion data.

In yet another embodiment, there is provided a computer readable medium comprising computer executable instructions configured to perform the following acts:) a) forming transmit signals having different phases between a $n^{th}$ frame and a $(n+1)^{th}$ frame; b) transmitting and receiving ultrasound signals to and from a target object based on the transmit signals to output ultrasound data; c) forming motion data corresponding to a motion of the target object based on a phase difference between the ultrasound data corresponding to the $n^{th}$ frame and the ultrasound data corresponding to the $(n+1)^{th}$ frame; and d) forming a motion image corresponding to the motion of the target object based on the motion data.

This summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
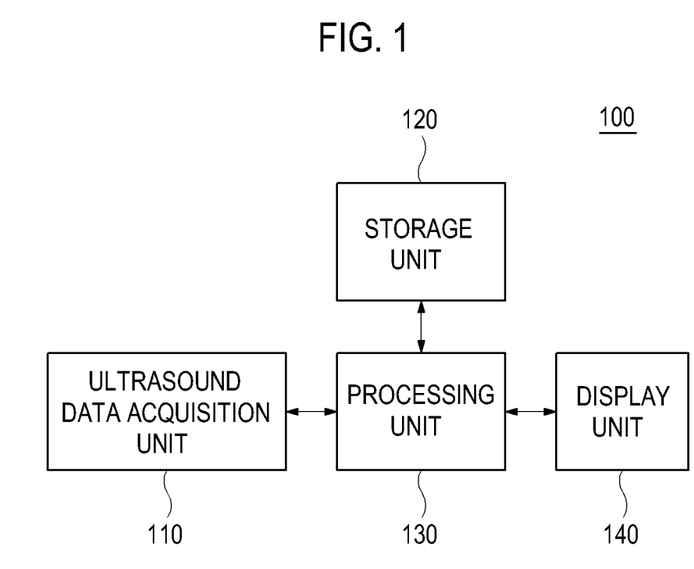
FIG. 1 is a block diagram showing an illustrative embodiment of an ultrasound system.

Referring to FIG. 1, an ultrasound system 100 in accordance with an illustrative embodiment is shown. As depicted therein, the ultrasound system 100 may include an ultrasound data acquisition unit 110. The ultrasound data acquisition unit 110 may be configured to transmit and receive ultrasound signals to and from a living body (not shown), and output ultrasound data. The living body may include a plurality of target objects (e.g., blood vessels, a heart, blood etc.).

Figure 2:
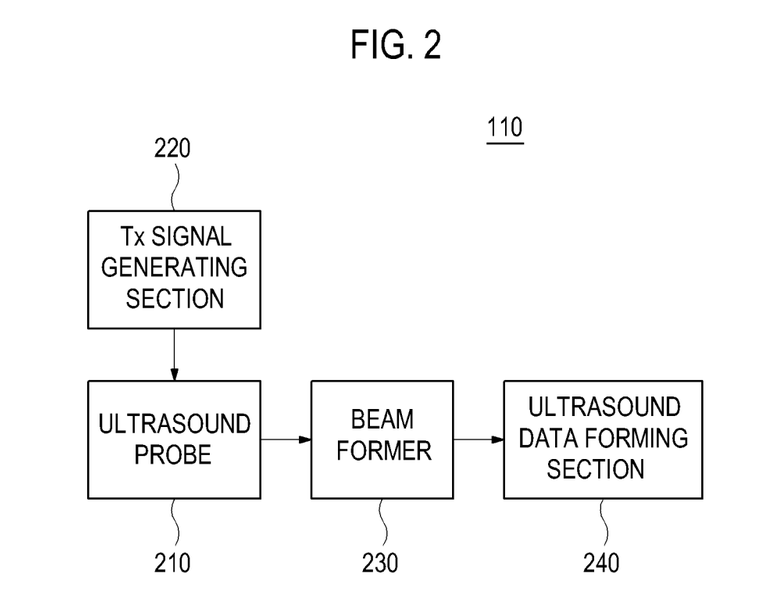
FIG. 2 is a block diagram showing an illustrative embodiment of an ultrasound data acquisition unit.

FIG. 2 is a block diagram showing an illustrative embodiment of the ultrasound data acquisition unit 110. Referring to FIG. 2, the ultrasound data acquisition unit 110 may include an ultrasound probe 210, a transmit (Tx) signal generating section 220, a beam former 230 and an ultrasound data forming section 240.

The ultrasound probe 210 may include a plurality of elements (not shown) for reciprocally converting between ultrasound signals and electrical signals. The ultrasound probe 210 may be configured to transmit ultrasound signals to the living body. The ultrasound probe 210 may further receive ultrasound signals (i.e., ultrasound echo signals) from the living body and output the received signals. The received signals may be analog signals. The ultrasound probe 210 may include a convex probe, a linear probe, a phase array probe and the like.

The Tx signal generating section 220 may be configured to control the transmission of the ultrasound signals. The Tx signal generating section 220 may further generate electrical signals ("Tx signals") corresponding to each of a plurality of frames in consideration of the elements and focal points. The frame may include a brightness mode image. However, it should be noted herein that the frame may not be limited thereto.

In one embodiment, the Tx signal generating section 220 may be configured to generate Tx signals having a different phase between a $n^{th}$ (n is positive integer) frame and a $(n+1)^{th}$ frame. That is, the Tx signal generating section 220 may be configured to generate the Tx signals whose phase is changed by 180 degrees at every frame.

For example, the Tx signal generating section 220 may be configured to generate first Tx signals having the phase of 0 degree for odd frames (that is, $(2n-1)^{th}$ frames), and generate second Tx signals having a phase of 180 degrees for even frames (that is, $2n^{th}$ frames). Thus, the ultrasound probe 210 may convert the first Tx signals provided from the Tx signal generating section 220 into the ultrasound signals, transmit the ultrasound signals to the living body and receive the ultrasound echo signals from the living body to thereby output first received signals. The ultrasound probe 210 may further convert the second Tx signals provided from the Tx signal generating section 220 into the ultrasound signals, transmit the ultrasound signals to the living body and receive the ultrasound echo signals from the living body to thereby output second received signals.

As another example, the Tx signal generating section 220 may be configured to generate first Tx signals having a phase of 180 degrees for odd frames (i.e., $(2n-1)^{th}$ frames) and generate second Tx signals having a phase of 0 degree for even frames (i.e., $2n^{th}$ frames). Thus, the ultrasound probe 210 may convert the first Tx signals provided from the Tx signal generating section 220 into the ultrasound signals, transmit the ultrasound signals to the living body and receive the ultrasound echo signals from the living body to thereby output first received signals. The ultrasound probe 210 may further convert the second Tx signals provided from the Tx signal generating section 220 into the ultrasound signals, transmit the ultrasound signals to the living body and receive the ultrasound echo signals from the living body to thereby output second received signals.

The beam former 230 may be configured to convert the received signals provided from the ultrasound probe 210 into digital signals. The beam former 230 may be further configured to apply delays to the digital signals in consideration of the elements and the focal points to output digital receive-focused signals.

In one embodiment, the beam former 230 may be configured to convert the first received signals provided from the ultrasound probe 210 into first digital signals. The beam former 230 may further apply delays to the first digital signals in consideration of the first digital signals in consideration of the elements and the focal points to output first digital receive-focused signals. Further, the beam former 230 may be configured to convert the second received signals provided from the ultrasound probe 210 into second digital signals. The beam former 230 may further apply delays to the second digital signals in consideration of the elements and the focal points to output second digital receive-focused signals.

The ultrasound data forming section 240 may be configured to form ultrasound data based on the digital receive-focused signals provided from the beam former 230. The ultrasound data forming section 240 may further perform various signal processing (e.g., gain adjustment) upon the digital receive-focused signals.

In one embodiment, the ultrasound data forming section 240 may be configured to form first ultrasound data based on the first digital receive-focused signals provided from the beam former 230. The ultrasound data forming section 240 may further form second ultrasound data based on the second digital receive-focused signals provided from the beam former 230.

Referring back to FIG. 1, the ultrasound system 100 may further include a storage unit 120. The storage unit 120 may store the ultrasound data for the frames sequentially. For example, the storage unit 120 may store the first ultrasound data and the second ultrasound data for the frames, as shown in Table 1.

TABLE 1

| Sequence | Frame | Ultrasound data |
| --- | --- | --- |
| 1 | Frame $BF_1$ | First ultrasound data |
| 2 | Frame $BF_2$ | Second ultrasound data |
| 3 | Frame $BF_3$ | First ultrasound data |
| 4 | Frame $BF_4$ | Second ultrasound data |
| 5 | Frame $BF_5$ | First ultrasound data |
| ... | ... | ... |

The ultrasound system 100 may further include a processing unit 130 in communication with the ultrasound data acquisition unit 110 and the storage unit 120. The processing unit 130 may be configured to form a brightness mode image and an image ("motion image") corresponding to a motion of the target object.

Figure 3:
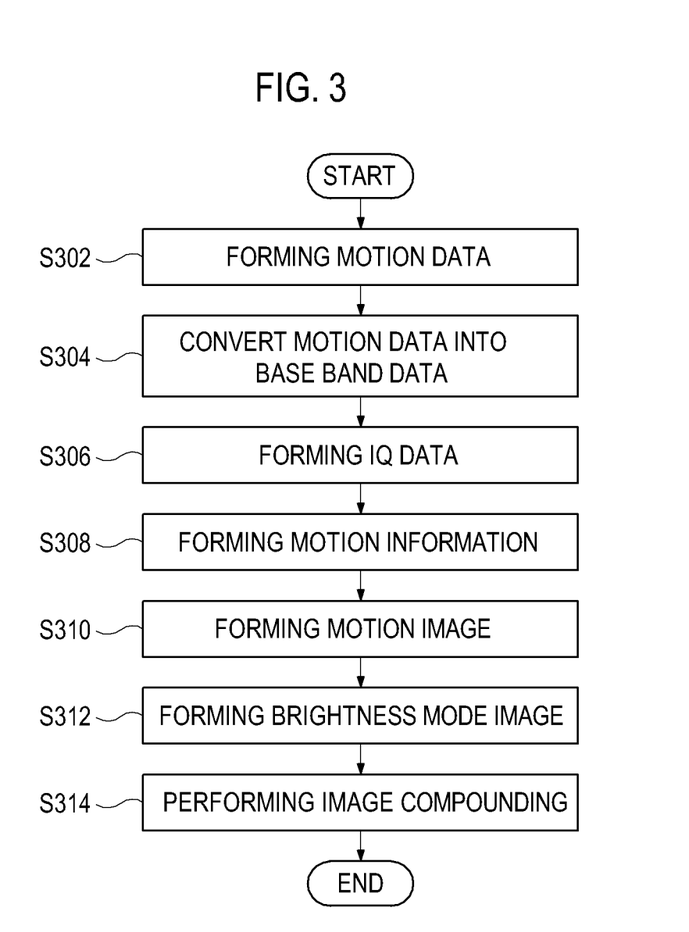
FIG. 3 is a flow chart showing a process of forming a motion image and a compound image.

FIG. 3 is a flow chart showing a process of providing the motion image. The processing unit 130 may be configured to perform a data processing between ultrasound data corresponding to the $n^{th}$ frame and ultrasound data corresponding to the $(n+1)^{th}$ frame to form data ("motion data") for obtaining a frame ("sub frame") corresponding to the motion of the target object, at step S302 in FIG. 3. That is, the processing unit 130 may be configured to perform the data processing between ultrasound data having different phases.

Figure 4:
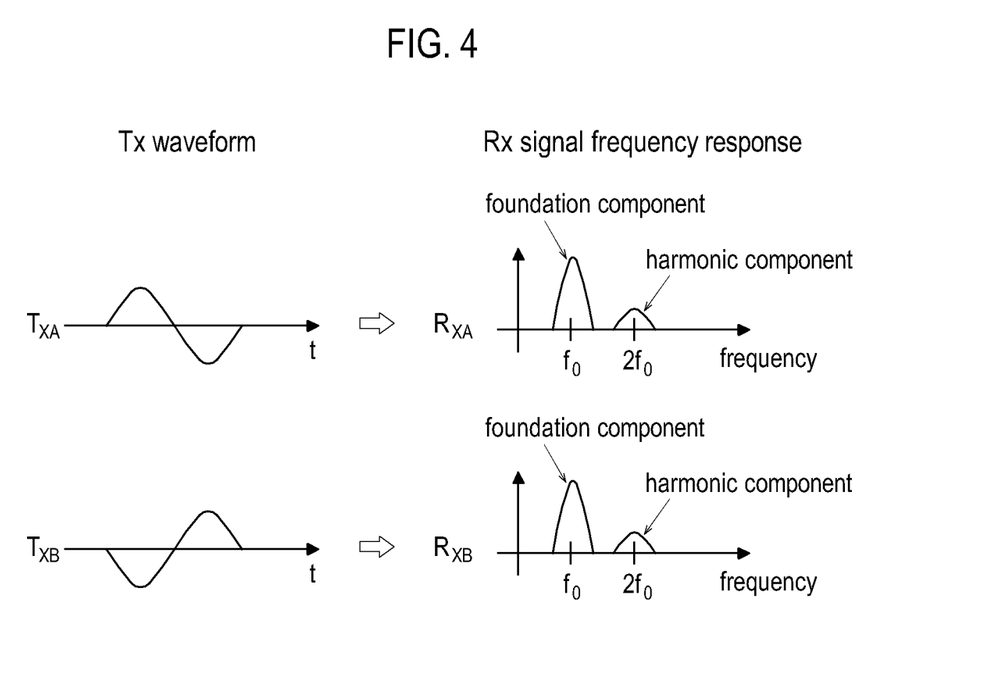
FIG. 4 is a schematic diagram showing an example of a transmit waveform and a receive signal frequency response.
Figure 5:
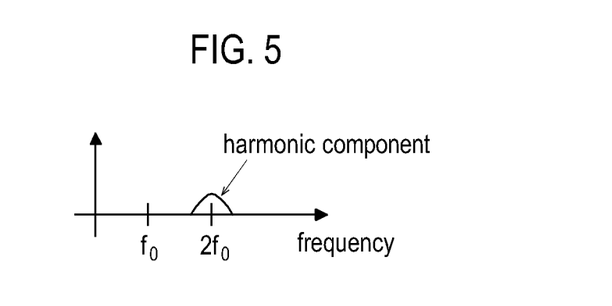
FIG. 5 is a schematic diagram showing an example of adding ultrasound data having different phases when a target object within a living body does not move.

When the target object within the living body does not move, the receive signals $Rx_A$ and $Rx_B$ corresponding to the ultrasound signals $Tx_A$ and $Tx_B$, which have different phases, may have fundamental components and harmonic components, as shown in FIG. 4. Thus, the processing unit 130 may be configured to add the ultrasound data corresponding to the receive signals $Rx_A$ and the ultrasound data corresponding to the receive signals $Rx_B$ to thereby form data, which has the harmonic components only, while eliminating the fundamental components, as shown in FIG. 5.

Figure 6:
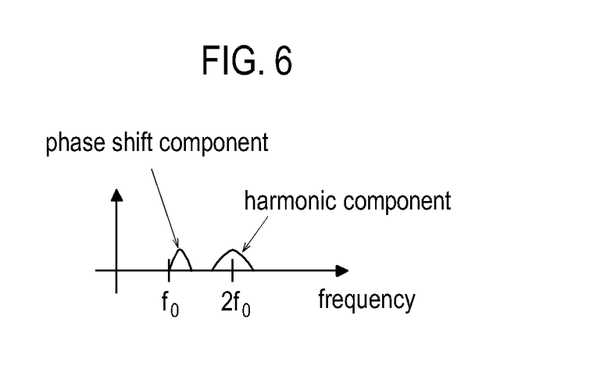
FIG. 6 is a schematic diagram showing an example of adding ultrasound data having different phases when the target object within the living body moves.
Figure 7:
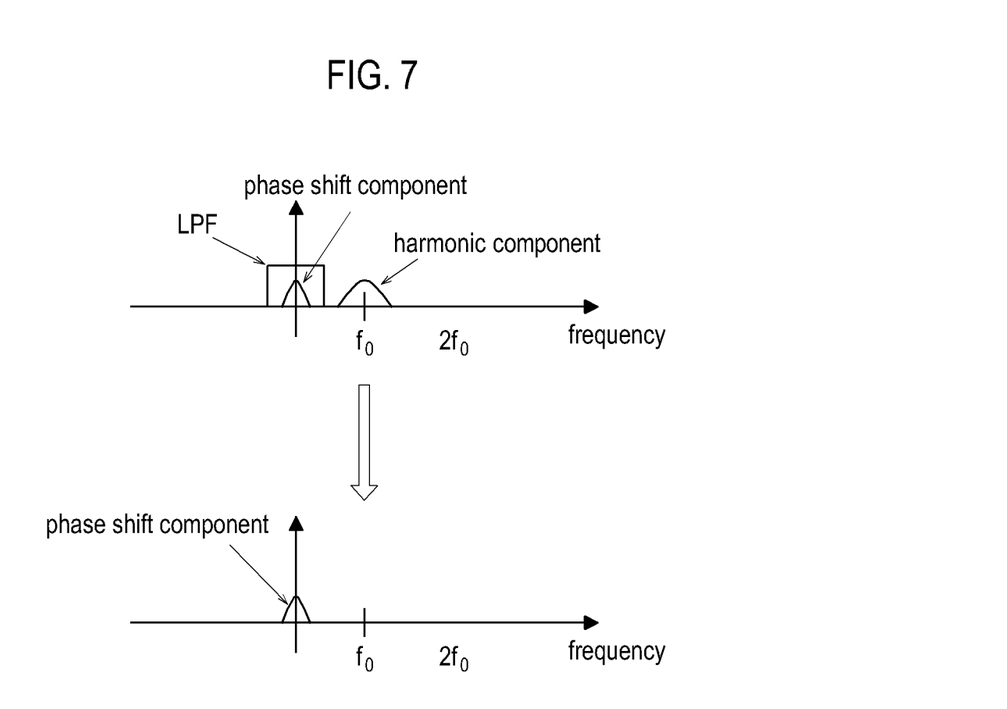
FIG. 7 is a schematic diagram showing an example of a downmixing and filtering process.

When the target object within the living body moves, the processing unit 130 may be configured to add the ultrasound data having different phases to thereby form data, which has the harmonic component and phase shift component corresponding to the motion of the target object. The processing unit 130 may be configured to perform downmixing upon the data, which has the harmonic component and the phase shift component, as shown in FIG. 6. The processing unit 130 may further perform low pass filtering upon the downmixed data to thereby form the motion data, which has the phase shift component only, as shown in FIG. 7. In FIG. 7, the reference numeral LPF represents a low pass filter.

Figure 8:
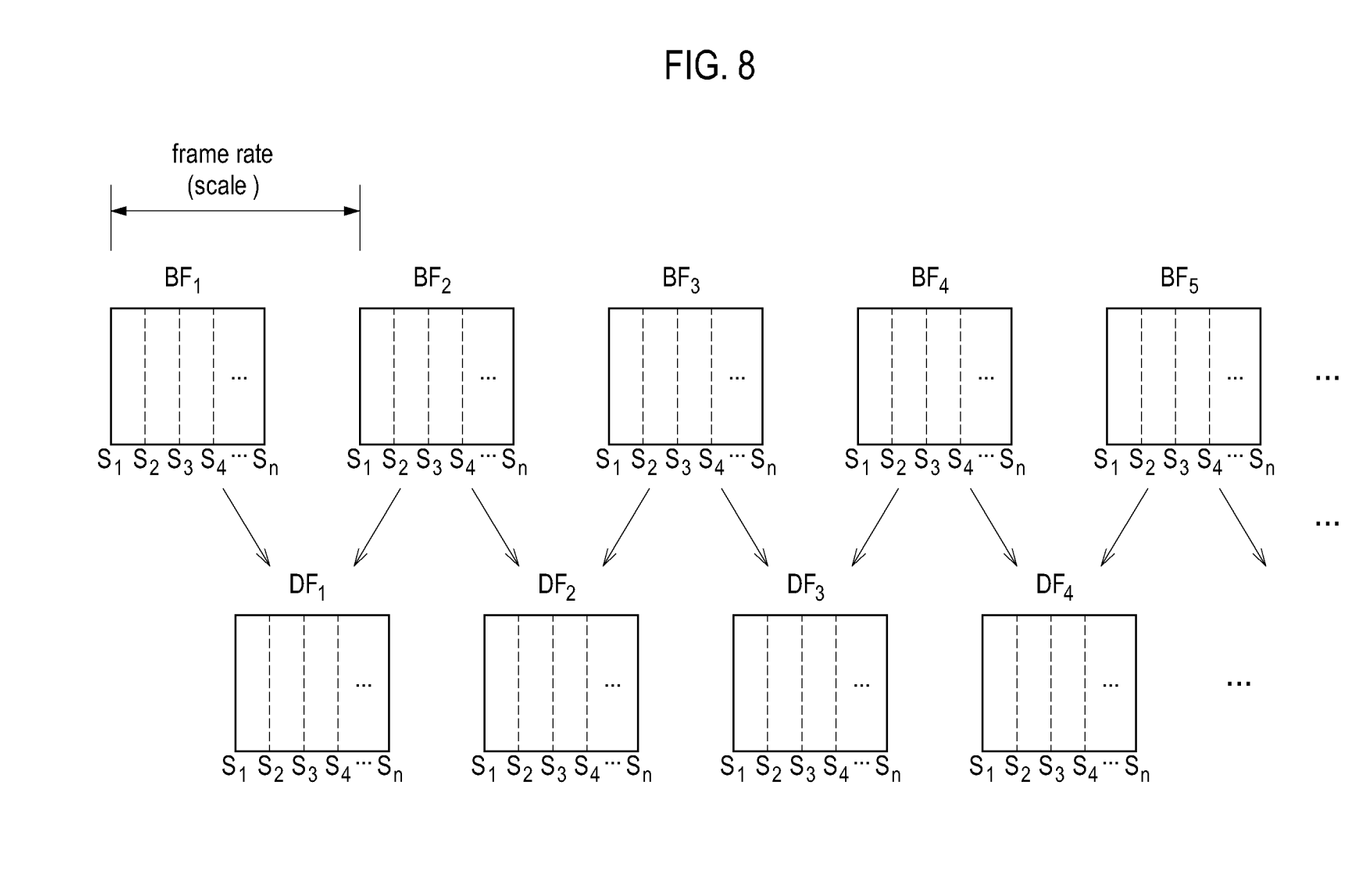
FIG. 8 is a schematic diagram showing an example of forming motion frames.

In one embodiment, the processing unit 130 may be configured to perform the data processing (adding, downmixing and filtering) between first ultrasound data corresponding to the frame $BF_1$ and second ultrasound data corresponding to the frame $BF_2$ to thereby form the motion data corresponding to the sub frame $DF_1$, as shown in FIG. 8. In FIG. 8, reference numerals $S_1$ to $S_n$ represent scanlines. The processing unit 130 may further perform the data processing (adding, downmixing and filtering) between second ultrasound data corresponding to the frame $BF_2$ and first ultrasound data corresponding to the frame $BF_3$ to thereby form the motion data corresponding to the sub frame $DF_2$. The processing unit 130 may further form the motion data corresponding to each of the sub frames mentioned above.

The processing unit 130 may be configured to convert the motion data into base band data, at step S304 in FIG. 3. The processing unit 130 may be configured to form in-phase/quadrature data ("IQ data") based on the base band data, at step S306 in FIG. 3.

The processing unit 130 may be configured to form motion information based on the IQ data, at step S308 in FIG. 3. The motion information may include velocity and power. However, it should be noted herein that the motion information may not be limited thereto.

In one embodiment, the processing unit 130 may calculate the velocity and power by using the IQ data corresponding to an ensemble number as ensemble data. The methods of calculating the velocity and the power based on the IQ data are well known in the art. Thus, they have not been described in detail so as not to unnecessarily obscure the present invention. The processing unit 130 may further form the motion information based on the velocity and power.

Figure 9:
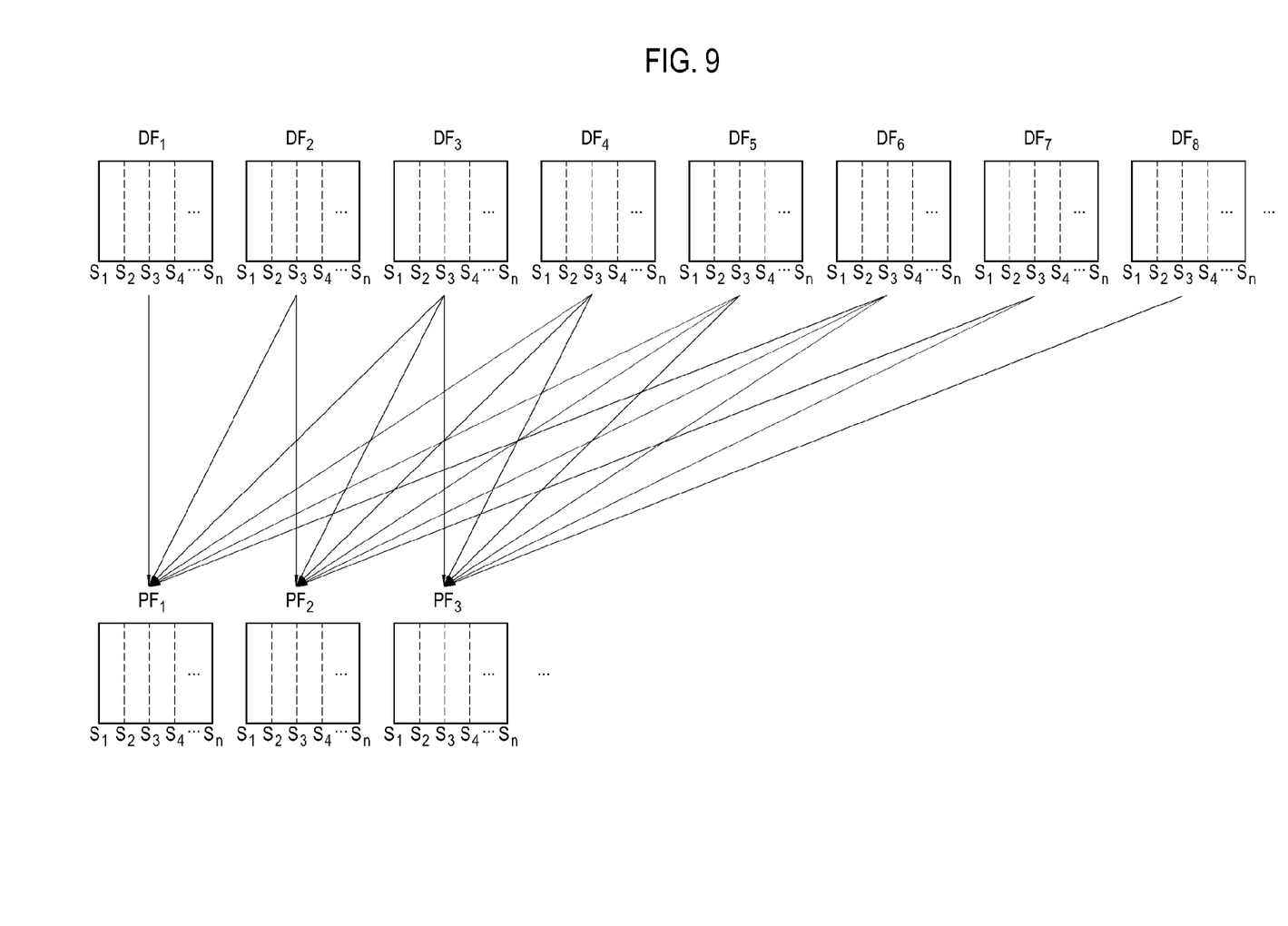
FIG. 9 is a schematic diagram showing an example of forming motion images.
Figure 10:
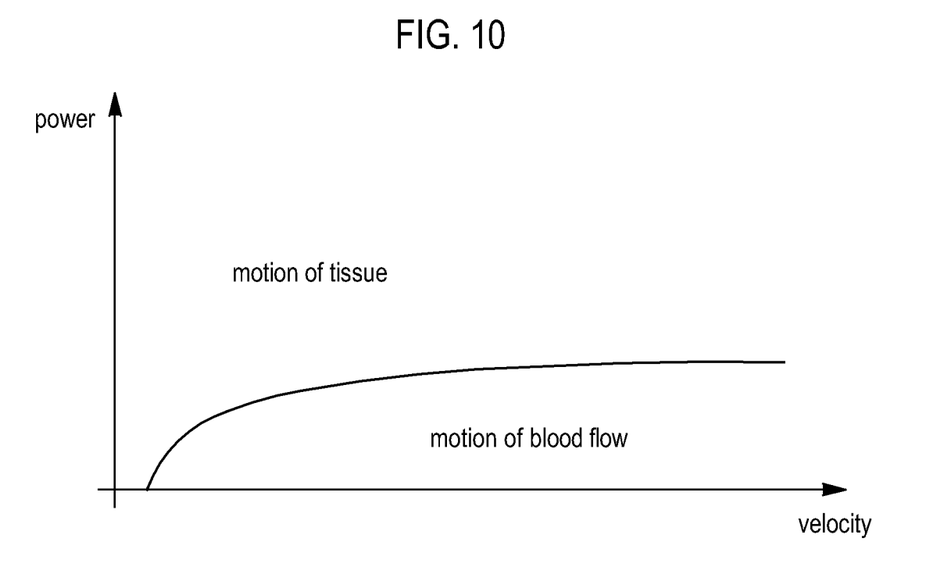
FIG. 10 is a schematic diagram showing an example of classifying a motion of tissue and a motion of blood flow based on velocity and power.

For example, the processing unit 130 may extract motion data corresponding to the sub frames $DF_1$ to $DF_6$ based on the ensemble number (N=6), and then form the motion information corresponding to the motion image $PF_1$ based on the extracted motion data, as shown in FIG. 9. The processing unit 130 may further extract motion data corresponding to the sub frames $DF_2$ to $DF_7$ based on the ensemble number, and then form the motion information corresponding to the motion image $PF_2$ based on the extracted motion data. The processing unit 130 may also form the motion information corresponding to each of the motion images mentioned above.

The processing unit 130 may be configured to form the motion image based on the motion information, at step S310 in FIG. 3. In one embodiment, the processing unit 130 may be configured to form the motion image based on a gray map corresponding to the motion information. That is, the processing unit 130 may form the motion image based on the gray map, which sets a gray level (0 to 255) corresponding to the motion information (velocity and power) on each of the pixels of the motion image. In another embodiment, the processing unit 130 may be configured to form the motion image based on a color map corresponding to the motion information. That is, the color may be provided to set a color corresponding to the motion information (velocity and power) on each of the pixels of the motion image.

Optionally, the processing unit 130 may further perform a segmentation of motion of the target object (e.g., blood flow) and motion of tissues (e.g., blood vessels, a heart, etc.). The methods of performing the segmentation are well known in the art. Thus, they have not been described in detail so as not to unnecessarily obscure the present invention. The processing unit 130 may further form the motion image based on the segmented motion.

The processing unit 130 may be configured to form a brightness mode image, at step S312 in FIG. 3. In one embodiment, the processing unit 130 may retrieve the storage unit 120 to extract ultrasound data corresponding to a frame from the storage unit 120. The processing unit 130 may further form the brightness mode image based on the extracted ultrasound data.

Although it is described above that the processing unit 130 may form the brightness mode image based on the extracted ultrasound data, the processing unit 130 may extract ultrasound data corresponding to each of the frames from the storage unit 120 and form the brightness mode images based on the extracted ultrasound data.

The processing unit 130 may be configured to perform an image compounding upon the motion image and the brightness mode image to form a compound image, at step S314 in FIG. 3. The methods of performing the image compounding are well known in the art. Thus, they have not been described in detail so as not to unnecessarily obscure the present invention.

Referring back to FIG. 1, the ultrasound system 100 may further include a display unit 140. The display unit 140 may display the motion image formed by the processing unit 130. The display unit 140 may further display the compound image. The display unit 140 may further display the brightness mode image.

In another embodiment, the present invention may provide a computer readable medium comprising computer executable instructions configured to perform the following acts: a) forming transmit signals having different phases between a $n^{th}$ frame and a $(n+1)^{th}$ frame; b) transmitting and receiving ultrasound signals to and from a target object based on the transmit signals to output ultrasound data; c) forming motion data corresponding to motion of the target object based on a phase difference between the $n^{th}$ frame and the $(n+1)^{th}$ frame; and d) forming a motion image corresponding to the motion of the target object based on the motion data. The computer readable medium may comprise a floppy disk, a hard disk, a memory, a compact disk, a digital video disk, etc.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
an ultrasound data acquisitor configured to form transmit signals having different phases between a $n^{th}$ frame and a $(n+1)^{th}$ frame, the ultrasound data acquisitor being further configured to transmit and receive ultrasound signals to and from a target object based on the transmit signals to output ultrasound data; and
a processor in communication with the ultrasound data acquisitor, the processor being configured to form motion data corresponding to motion of the target object based on a phase difference between the ultrasound data corresponding to the $n^{th}$ frame and the ultrasound data corresponding to the $(n+1)^{th}$ frame, the processor being further configured to form a motion image corresponding to the motion of the target object based on the motion data.

2. The ultrasound system of claim 1, wherein the ultrasound data acquisitor is configured to form the transmit signals whose phase is changed by 180 degrees at every frame.

3. The ultrasound system of claim 2, wherein the ultrasound data acquisition unit acquisitor is configured to form first ultrasound data having the phase of 0 degree for odd frames and form second ultrasound data having the phase of 180 degrees for even frames.

4. The ultrasound system of claim 2, wherein the ultrasound data acquisitor is configured to form first ultrasound data having the phase of 180 degrees for odd frames and form second ultrasound data having the phase of 0 degree for even frames.

5. The ultrasound system of claim 1, wherein the processor is configured to:
perform a data processing between the ultrasound data corresponding to the $n^{th}$ frame and the ultrasound data corresponding to the $(n+1)^{th}$ frame to form the motion data;
form in-phase/quadrature data based on the motion data;
form motion information for obtaining the motion image based on the in-phase/quadrature data and an ensemble number; and
form the motion image based on the motion information.

6. The ultrasound system of claim 5, wherein the motion information includes velocity and power.

7. The ultrasound system of claim 5, wherein the processor is configured to:
convert the motion data into base band data; and
form the in-phase/quadrature data based on the base band data.

8. The ultrasound system of claim 5, wherein the processor is configured to form the motion image based on a gray map for setting a gray level corresponding to the motion information on each of pixels of the motion image.

9. The ultrasound system of claim 5, wherein the processor is configured to form the motion image based on a color map for setting a color corresponding to the motion information on each of pixels of the motion image.

10. The ultrasound system of claim 5, wherein the processor is further configured to:
form a brightness mode image based on the ultrasound data; and
perform an image compounding upon the motion image and the brightness mode image to form a compound image.

11. A method of providing a motion image, comprising:
a) forming transmit signals having different phases between a $n^{th}$ frame and a $(n+1)^{th}$ frame;
b) transmitting and receiving ultrasound signals to and from a target object based on the transmit signals to output ultrasound data;
c) forming motion data corresponding to motion of the target object based on a phase difference between the ultrasound data corresponding to the $n^{th}$ frame and the ultrasound data corresponding to the $(n+1)^{th}$ frame; and
d) forming a motion image corresponding to the motion of the target object based on the motion data.

12. The method of claim 11, wherein the step a) comprises:
forming the transmit signals whose phase is changed by 180 degrees at every frame.

13. The method of claim 12, wherein the step a) comprises:
forming first ultrasound data having the phase of 0 degree for odd frames; and
forming second ultrasound data having the phase of 180 degrees for even frames.

14. The method of claim 12, wherein the step a) comprises:
forming first ultrasound data having the phase of 180 degrees for odd frames; and
forming second ultrasound data having the phase of 0 degree for even frames.

15. The method of claim 11, wherein the step c) comprises:
c1) performing a data processing between the ultrasound data corresponding to the $n^{th}$ frame and the ultrasound data corresponding to the $(n+1)^{th}$ frame to form the motion data;
c2) forming in-phase/quadrature data based on the motion data;
c3) forming motion information for obtaining the motion image based on the in-phase/quadrature data and an ensemble number; and
c4) forming the motion image based on the motion information.

16. The method of claim 15, wherein the motion information includes velocity and power.

17. The method of claim 15, wherein the step c2) comprises:
converting the motion data into base band data; and
forming the in-phase/quadrature data based on the base band data.

18. The method of claim 15, wherein the step d) comprises:
forming the motion image based on a gray map for setting a gray level corresponding to the motion information on each of pixels of the motion image.

19. The method of claim 15, wherein the step d) comprises:
forming the motion image based on a color map for setting a color corresponding to the motion information on each of pixels of the motion image.

20. The method of claim 11, further comprising:
forming a brightness mode image based on the ultrasound data; and
performing an image compounding upon the motion image and the brightness mode image to form a compound image.

21. A non-transitory computer readable medium comprising computer executable instructions configured to perform following acts:

a) forming transmit signals having different phases between a $n^{th}$ frame and a $(n+1)^{th}$ frame;
b) transmitting and receiving ultrasound signals to and from a target object based on the transmit signals to output ultrasound data;
c) forming motion data corresponding to motion of the target object based on a phase difference between the $n^{th}$ frame and the $(n+1)^{th}$ frame; and
d) forming a motion image corresponding to the motion of the target object based on the motion data.

\* \* \* \* \*